United States Patent Office 3,616,601
Patented Nov. 2, 1971

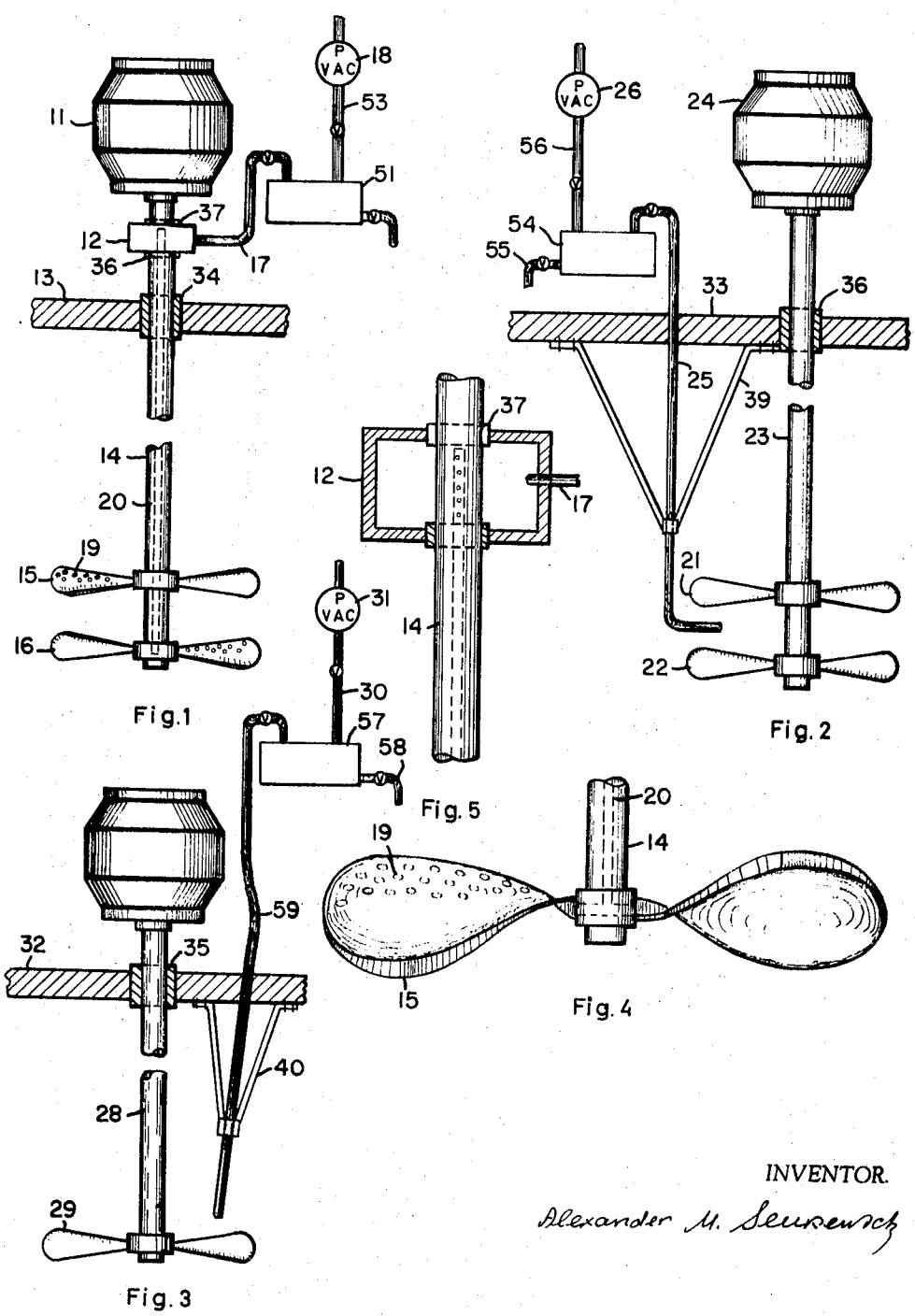

3,616,601
OBTAINING AIR FROM WATER BY A MECHANICAL PROCESS
Alexander M. Senkewich, 545 W. 164th St., New York, N.Y. 10032
Continuation of application Ser. No. 423,609, Jan. 5, 1965. This application Feb. 24, 1969, Ser. No. 813,372
Int. Cl. B01d *19/00*
U.S. Cl. 55—52    6 Claims

ABSTRACT OF THE DISCLOSURE

The extracting of air by means of a pump from air pockets formed in water around the propeller blades.

RELATED APPLICATION

Reference is made to my copending application, Ser. No. 433,561, filed Feb. 18, 1965, now Pat. No. 3,273,529, granted Sept. 20, 1966, entitled "Means and Method for Increasing the Speed of Ships," and to copending application Ser. No. 423,609, filed Jan. 5, 1965, bearing the same title, and abandoned on the filing date hereof; this application being a continuation thereof.

Fresh water, as well as salt water, contains approximately 3% of air mixed mechanically with water. This air is sufficient to sustain the breathing of all sea creatures living in water. Fish, for example, due to their particular arrangement of gills, absorb into their blood vessels only the oxygen from the air mixed with water entering their gills. By the proposed invention, I achieve the separation of air from water with all its constituent elements—oxygen, nitrogen, etc. My invention is based upon the following principle:

It is known that a motor boat developing excessively high speed begins to decelerate at some limiting speed, i.e., at some limiting acceleration of the propeller, the boat will not increase, but rather decrease its speed. This occurs because at these limiting speeds there forms around the propeller blades a vacuum pocket which will be filled with air from the neighboring layers of water. This means that in this case there is no force obtained from the water by the propeller blades, and the boat will continue to decrease its speed up to the point where the vacuum pocket disappears. I propose that this air be extracted by the pump from the air pocket by applying the principle and design described below. That is, when installed in a submarine, my device will supply the personnel of the submarine with air obtained from water by a mechanical process.

Referring broadly to the figures:

FIG. 1 is a side view of the entire device wherein there are two assemblies of the blades and the shafts are hollow. The wall is shown in cross section throughout the figures.

FIG. 2 is a side view of the entire device wherein there are two assemblies of the blades, and the shaft is not hollow.

FIG. 3 is a side view of the device with one assembly of the blades, and wherein the blades and the shaft are not hollow.

FIG. 4 is a perspective view, on an enlarged scale, of the hollow blade used in FIG. 1.

FIG. 5 illustrates the air collector, on an enlarged scale, used in FIG. 1.

Figure 6:
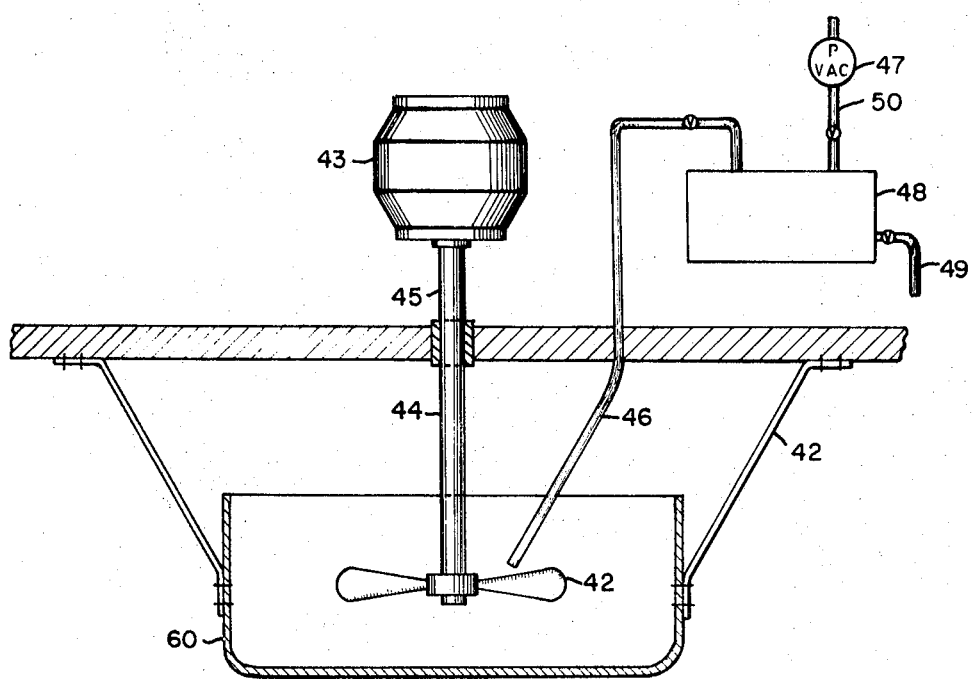
FIG. 6 is a side view of the entire device of a fourth variation or fourth modification of the invention.
Figure 7:
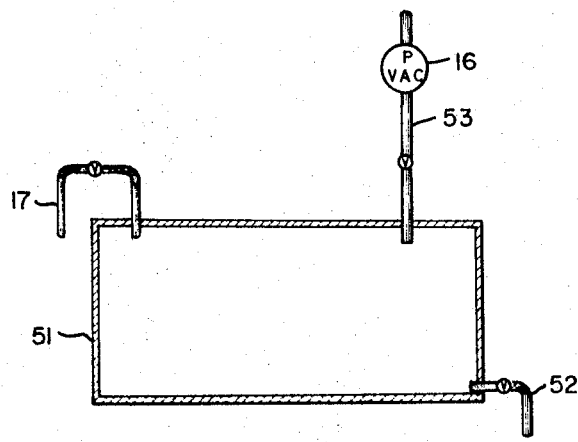
FIG. 7 illustrates the settler used in FIG. 1 on an enlarged scale.

The above mentioned drawings represent four variations or applications of my invention. In the first two variations (see FIG. 1 and FIG. 2) two assemblies of blades have been used for the following reason:

If, as is usual, only one assembly of blades is used as shown in FIG. 3, then the submarine will move due to the rotation of the shaft. Consequently, air will be supplied to the boat only if the latter is moving. If it becomes necessary to pump air into the boat when, due to some circumstances, the latter is forced to remain motionless, another variation must be used. In order for the boat not to move during the rotation of the shaft, I use two assemblies of blades. Each propeller is rigidly keyed to shaft 14 whereby when the shaft rotates the multiple propellers 15 and 16 will rotate in the same direction. However, the faces or working surfaces of each propeller blade are bent in opposite directions as illustrated by apertures 19 in propellers 15 and 16 so that their normal propelling forces completely cancel each other. In other words, the rotation of the shaft operates one assembly of the blades which force the water towards the boat, and the boat should be moving with the stern forward. The other assembly of the blades, however, at this time forces the water in the direction away from the boat, and the boat should be moving with the bow forward. Thus, the two equal forces acting on the boat, and directed in opposite directions, are balanced out and the boat remains motionless.

In all four variations or modifications, a section of the wall through which the shaft of the motor passes has been cut out. Part of the device above the wall, as shown on the drawings, is located inside the boat. Part of the device below the wall, as shown on the drawings, is located in water outside the boat.

In the first two variations, the motor is powered by an electrical current from the source of energy supplying also the motor of the submarine. The engine power depends on the amount of air necessary to supply the submarine personnel.

Variation 1: FIG. 1 shows the device wherein the blades 15 and 16 and shaft 14 are hollow. The working surfaces of the blades have apertures 19 (see FIG. 4). Thus when motor 11 operates and shaft 14 rotates, the blades 15 and 16 also rotate.

At some limiting number of revolutions of the shaft 14 carrying blades 15 and 16, there is formed a vacuum pocket which will be filled with air from the neighboring layers of water. This air passes through the aperture 19 in the blades and through the duct 20 in the shaft 14 to enter the air collector 12. From the air collector it is pumped out according to its designation by pump 18 via pipe 17. Duct 20 terminates in the air collector 12.

In order to maintain the equilibrium, the space previously occupied by the pumped out air will be filled by fresh air from the neighboring layers of water. The disturbed equilibrium in these layers will be reestablished by the incoming air from the nearest upper layers of water and so on up to the last or top layer of the inner surface where the equilibrium will be reestablished by the air from the surrounding atmosphere above the water. Consequently, an unlimited amount of air can be pumped from the sea reservoir whose upper surface is interfaced or is in contact with the surrounding atmosphere.

The pumped air is actually the air of the surrounding atmosphere. This air passes through a water filter, i.e., the thickness of the water layer, above the proposed device. So that air will enter into pump 18 without water, there is installed settler 51 from which the water will pour out through pipe 52. But clean air will go by designation via pipe 53, as in the first variation.

The principle relied upon here for extracting air from water is further explained in my above mentioned Patent No. 3,273,529 entitled "Means and Method for Increasing the Speed of Ships."

Variation 2: FIG. 2 shows the device also having 2 assemblies of blades 21 and 22. Here, as in variation 1, during the operation of the shaft 23 the boat will remain motionless, since the pitch of each assembly of blades is reversed to negate any propelling force.

In variation 2, however. neither the blades nor the shaft is hollow. In this variation, when the motor is started, at some limiting number of revolutions of the shaft 23 around the blades 21 and 22, as in the first variation, there will form a vacuum pocket which will be filled with air from the neighboring layers of water. This air will be pumped out according to its designation through pipe 25 by pump 26. The process of creating equilibrium of air in the nearby layers of water will be analogous to that described in the first variation.

Pipe 25 is supported by brackets 39. So that air will enter into pump 26 without water, installed is settler 54 from which the water will pour out by pipe 55. But clean air will go by designation via pipe 56.

Variation 3: FIG. 3 represents a case where the motor of the submarine is utilized in order to obtain air from water by mechanical means. During the operation of the main ship propulsion engine or motor 27, the submarine moves at some speed, and only when the number of revolutions of shaft 28 is great enough so that the boat will not increase its speed there will form a vacuum pocket around the blades 29 which will be filled with air from the neighboring layers of water. This air will be pumped out according to its designation by pump 31 through pipe 59, which is supported by brackets 40. The process of creating the equilibrium of the air in the neighboring layers of water will be analogous to that described in the first variation.

Elements 13, 32 and 33 are a part of the wall of the submarine. 34, 35, 36, 37, and 38 are the bearings. So that air will enter into the pump 31 without water, installed is settler 57 from which water will pour out by pipe 58. But clean air will go by designation via pipe 30. Aside from submarines, my invention can be successfully applied to supply air to the underwater homes which are already being built in some countries.

Variation 4: FIG. 6 shows the device where there is one assembly of blades 41. The blades are in box 60 which is closed from all sides except the front side and the top. The blades work in such a way that they force the water in the direction away from the boat. This water meets the wall of the box and the boat will not move. At some limiting number of revolutions of shaft 44 around blades 41 there forms a vacuum pocket which will be filled with air from the neighboring layers of water. This air will be pumped out according to its designation through pipe 46 by pump 47. The process of creating equilibrium of air in the nearby layers of water will be analogous to that described in the first variation. As in the first variation, so that the air will enter pump 47 without water, installed is settler 48 from which water will pour out by pipe 49. But clean air will go by designation via pipe 50. Box 60 is supported by brackets 42.

In all variations, letter (V) indicates valves with corresponding designations.

The embodiments of the invention in which an exclusive property or privilege is claimed are defined as follows:

1. Apparatus for extracting occluded air from water comprising a supply of water, a closed enclosure contiguous to the water such as a submerged home surrounded by water, means for drawing air into the enclosure comprising power means therewithin, a rotating shaft connected to said power means and extending outside said enclosure and even multiples of two propellers secured to the end of said rotating shaft, the blades on each of said propellers being pitched directly oppositely whereby the individual propelling forces exerted will be negated and said means for drawing occluded air into the enclosure from the surrounding water will become fully operative when the propellers reach a predetermined speed.

2. An apparatus as set forth in claim 1 wherein the enclosure is a submarine and the means for extracting occluded air from the surrounding water when the propellers reach a predetermined speed comprises at least one hollow propeller blade.

3. An apparatus as set forth in claim 2 wherein the propeller blades are hollow and the faces are provided with perforations, a hollow air duct within said rotating shaft, a collector at one end of said air duct connected thereto while communicating with the hollow interior of the blades, said collector also connected to said separator whereby when the propellers rotate at a predetermined speed air will be forced into the submarine through the hollow blades, air duct, collector and separator.

4. A method of extracting occluded air from sea water into a closed enclosure contiguous to said sea water comprising the steps of rapidly rotating a series of blades outside the closed enclosure so as to form air pockets around said blades, said air pockets being completely submerged below the surface of the sea water, removing the occluded air and limited quantities of surrounding water from said air pockets, collecting said combined air and water in a separation area, and withdrawing said air from a separation area and expelling it into the closed enclosure.

5. A method as set forth in claim 4 and moving the closed enclosure as occluded air is being extracted form the water.

6. A method as set forth in claim 4 and holding the closed enclosure stationary while occluded air is being extracted from the water.

References Cited

UNITED STATES PATENTS

| | | | |
|---|---|---|---|
| 1,658,460 | 2/1928 | Nichols | 259—133 |
| 1,671,601 | 5/1928 | Mills | 55—189 |
| 1,693,170 | 11/1928 | Alsop | 259—106 |
| 2,418,231 | 4/1947 | Kimm et al. | 55—203 X |
| 2,418,184 | 4/1947 | McConaghy | 55—203 X |
| 2,434,453 | 1/1948 | Beeman | 114—16.2 |
| 3,017,951 | 1/1962 | Wiley | 55—200 X |

REUBEN FRIEDMAN, Primary Examiner

R. W. BURKS, Assistant Examiner

U.S. Cl. X.R.

55—190; 144—16